United States Patent [19]
Kuhns

[11] Patent Number: 5,924,754
[45] Date of Patent: Jul. 20, 1999

[54] ADJUSTABLE DIMENSION TRAILER

[75] Inventor: Abe B. Kuhns, Arthur, Ill.

[73] Assignee: E-Z Trail, Inc., Arthur, Ill.

[21] Appl. No.: 08/866,494

[22] Filed: May 30, 1997

[51] Int. Cl.[6] ............................................. B62C 1/96
[52] U.S. Cl. ..................................... 296/26.15; 296/182
[58] Field of Search ................................. 296/26.15, 182

[56] References Cited

U.S. PATENT DOCUMENTS

| | | | |
|---|---|---|---|
| 1,831,441 | 11/1931 | Davis | 296/182 |
| 2,717,802 | 9/1955 | Martin | 296/182 |
| 4,015,858 | 4/1977 | Love | 296/182 |
| 4,662,020 | 5/1987 | Wilkerson | 296/182 |
| 4,943,106 | 7/1990 | Hunt | 296/26.15 |
| 5,490,754 | 2/1996 | Voelzke | 296/182 |

FOREIGN PATENT DOCUMENTS

| | | | |
|---|---|---|---|
| 339546 | 7/1921 | Germany | 296/26.15 |

OTHER PUBLICATIONS

*You'll Expand Your Horizons,* Wilson Trailer Company, 4 pages, 1990.
*Trail King "XL" Trailers,* Trail King Industries Inc., 2 pages, undated.

*Primary Examiner*—Gary C. Hoge
*Attorney, Agent, or Firm*—Lockwood, Alex, FitzGibbon & Cummings

[57] ABSTRACT

A trailer and method of adjusting the dimensions of the trailer are disclosed in which the trailer includes an elongate deck having a surface for receiving and supporting equipment loads thereon for transport. The trailer includes rotatably movable platforms along its edges which are rotatable between a first position presenting a minimum trailer width and a second position presenting an enlarged, maximum trailer width. When rotated to the maximum width position, the platforms also form a support surface which is of reduced height to maximize the height of equipment loads which may be supported and transported upon the trailer.

35 Claims, 2 Drawing Sheets

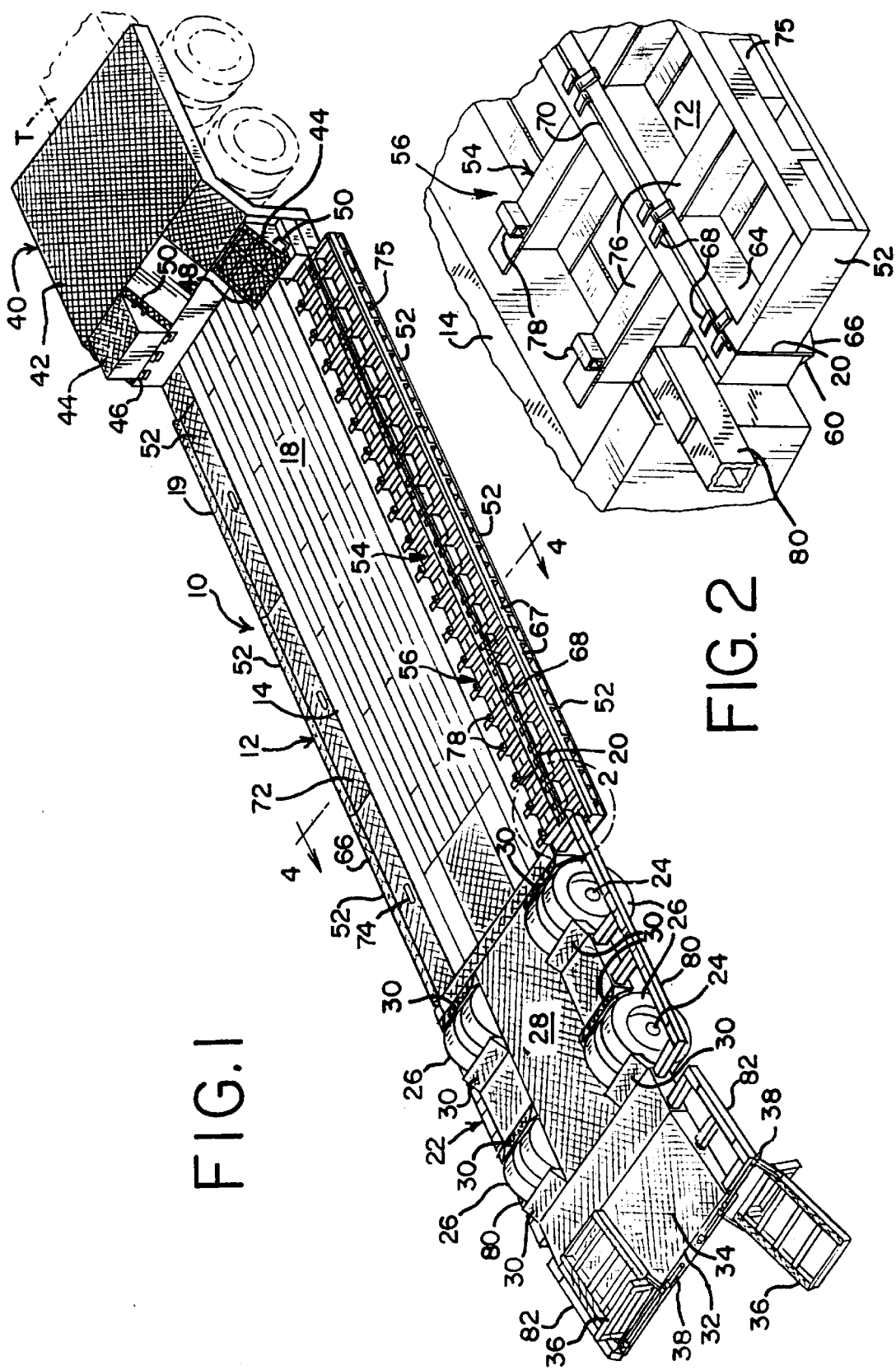

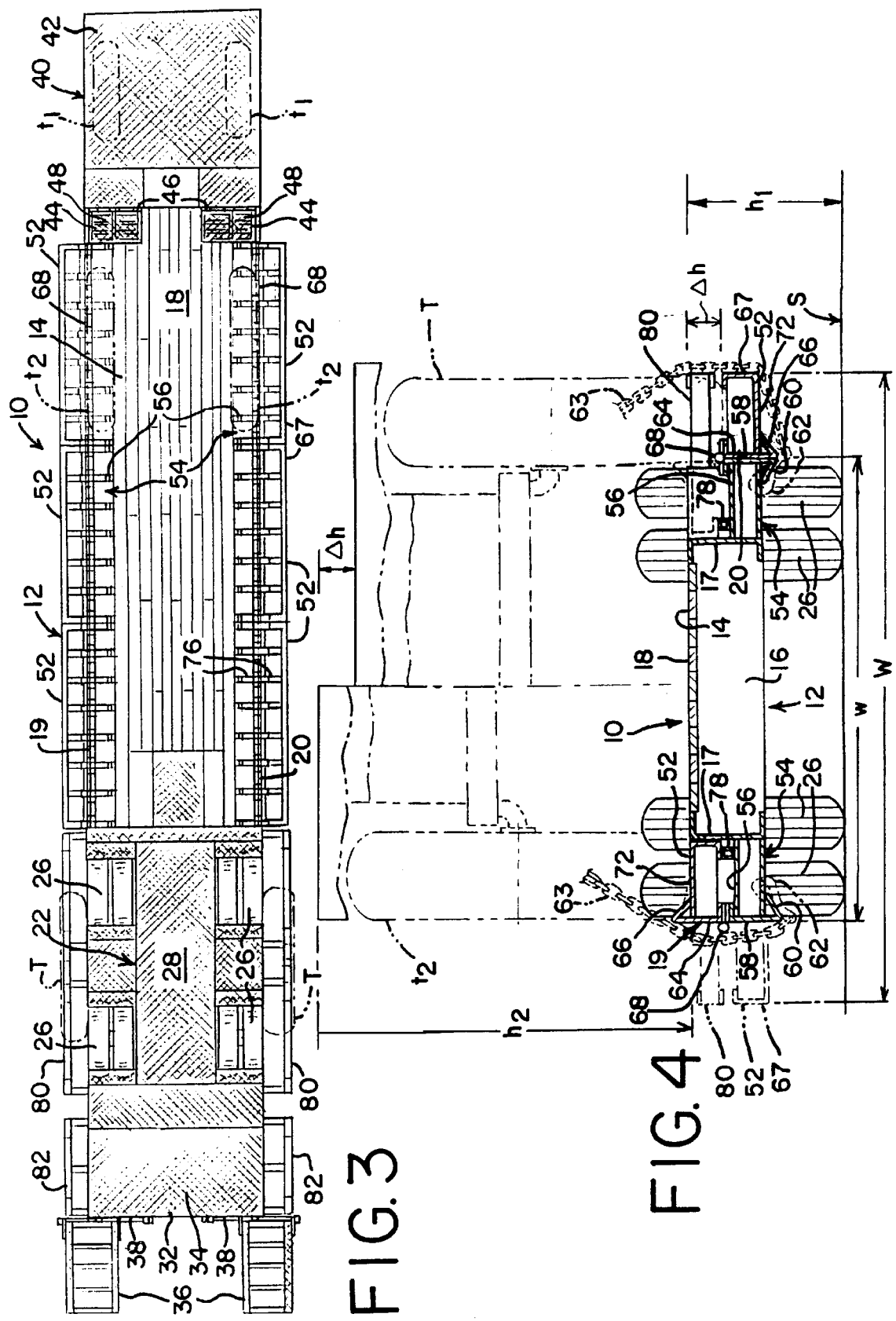

ADJUSTABLE DIMENSION TRAILER

BACKGROUND OF THE INVENTION

The present invention is directed to a trailer for the transport of loads, and more particularly, to an adjustable trailer in which the dimensions of the trailer may be adjusted to accommodate various equipment loads of different dimensions.

Significant governmental regulations exist which establish maximum height and width limits for trailers and other equipment and vehicles which are to be transported over public roads and highways. The older regulations in the United States establish the maximum legal width at 8 feet. Some of the more recent regulations have increased that maximum width, but even as so increased, the maximum legal width does not exceed 8.5 feet. Any vehicle or load exceeding the regulation maximum width is generally considered to be a wide load and, although it might be transportable, is subject to a number of restrictions. Moreover, if a trailer for transporting such wide loads, even if it is capable of enlargement in width to accommodate the additional load width, the enlarged width trailer is only permitted on the highways with the wide load on it. Once the load has been offloaded from the trailer, most regulations require that the width of the trailer must be within the maximum regulation width if the trailer is to be transported in an empty condition on the highway. Thus, in order to be practical, trailers capable of transporting loads of wide widths which exceed regulations must typically be somehow adjustable to permit return to the regulation width when empty so that they are capable of highway transport when empty or no restrictions when they are transporting loads of regulation widths. Maximum height restrictions also exist and these are typically 13.5 feet, or more recently 14 feet to permit clearance of bridges and other overhead obstructions.

In order to accommodate loads of widths and heights which meet legal restrictions, as well as loads which may have width dimensions which exceed such restrictions, and/or heights which when loaded on a trailer might exceed total height restrictions, various approaches have been taken in trailer construction for the support and transport of such large dimension loads. As to loads which have height dimensions which approach the maximum height restrictions when loaded on the trailer, a class of trailer has evolved which is generally referred to as a "lowboy" trailer. In such lowboy trailers at least a portion of the trailer deck is constructed to be as close to the roadway as possible. This permits the transport of loads which are of greater height and which might be close to the maximum height restrictions. With respect to load widths, lowboy and other trailers have also been constructed to permit the adjustment of their width so that they can be adjusted to either a minimum width configuration in which they are capable of supporting and transporting loads or equipment which are within governmental width restrictions, a maximum width configuration in which wide loads which exceed width restrictions may be supported and transported, and reduced back to minimum width when empty so that they may be transported empty on highways. An example of the latter maximum width loads may include some combine equipment in which the tread width of the combine may be of greater width than the governmental width restrictions.

One prior trailer width adjustment has typically been effected in the past by the provision of pullout platforms which are capable of being moved transversely and horizontally of the deck from beneath the deck surface in a drawer-like fashion to effectively increase the width of the deck surface when pulled out. However, such pullout platform constructions suffer several disadvantages. One disadvantage is that if any portion of the pullout platform becomes bent or sprung in any manner, movement of the platform either in or out is substantially impaired if not precluded altogether until the bend is fixed. Moreover, such pullout constructions are not as strong as the construction of the main deck itself. This itself can lead to the bending or distortion of the platforms when pulled out and loaded with heavy equipment which will tend to bounce on the platform during transport. If the platform structural strength is to be maximized to minimize such bending or distortion in use, its weight generally must be substantially increased. This can result in a loss of fuel economy and ability to meet pertinent weight regulations, and require hydraulic or other power systems for operation, rather than simple, less complex and inexpensive manual operation. Another disadvantage of the prior pullout platform constructions is that even when pulled out, there will be no appreciable change in deck height. Thus, no advantage is realized in the way of reduction of overall height of the load which may be important to meet some height regulations.

Another prior trailer width adjustment construction has included a drop leaf arrangement in which a plate is hinged for rotation to the upper edge of the trailer deck. When in the minimum width position, the plate hangs down much like a table drop leaf. When it is moved to the maximum width position, it is swung upward 90° to extend from the deck to form a continuation extension of the main deck of the trailer, much like a table drop leaf. The plate is supported in the up, maximum width position either by pullout supports as last described or by swing out supports which swing out about a vertical axis beneath the plate. The pullout support constructions suffer the same disadvantages as the pullout extensions previously described. Moreover, both support mechanisms lack strength and, therefore, are subject to bending and springing and a reduction in the load weight that can be supported. The amount of width enlargement that is possible in these drop leaf constructions is also substantially limited, particularly in lowboy trailers, due to the already low positioning of the trailer deck to the roadway which restricts the amount of plate width that can hang down in the minimum width position. Furthermore, there is no height adjustment in these drop leaf arrangements.

In a variation of the last mentioned drop leaf arrangements, the hinged drop leaf also has been replaced in part by simply placing planking on either the pullout or swing out supports to extend the width of the trailer deck. Although this arrangement may permit greater width enlargement than the drop leaf construction, it suffers all of the other disadvantages of such constructions. In addition, the supports tend to move relative to the relatively loose planking or vice versa during transport, and this increases the possibility of collapse in use and/or loss of the planking in or between uses.

SUMMARY OF THE INVENTION

The adjustable dimension trailer of the present invention overcomes the foregoing disadvantages. In the trailer of the present invention the movable width altering component comprises a platform in which strength is maximized both when positioned in its minimum width position as well as in its maximum width position. Accordingly, the possibility of bending or springing of the platform is substantially reduced without substantial increase in weight. Moreover, even if some flexing, bending or springing of the platform is experienced in use, it will not prevent or inhibit the movement of the platform between its minimum and maximum width positions in the construction and operation of the present invention. In addition the movable width altering component of the present invention may be manually moved between its positions, thus maximizing fuel economy and obviating the need for complex and expensive hydraulic or other power operating mechanisms or systems.

In addition to the foregoing advantages, a significant advantage of the present invention is that when the width altering component or platform of the invention is moved to its maximum width position, the overall height of the trailer support deck upon which the load or equipment is to be supported is reduced by a substantial amount, and when the platform is moved to its minimum width condition it supplements the support surface of the deck. Thus, the adjustable dimension trailer of the present invention is capable of not only accommodating loads of wide variations in width, but is also capable of permitting the transport of loads or equipment which could not previously be transported by lowboy trailers of the prior art without exceeding the maximum height regulations.

In one principal aspect of the present invention, a trailer for the transport of loads of various differing dimensions includes an elongate deck having a surface for receiving and supporting the loads for transport thereon, and the deck has a pair of spaced generally parallel edges which define a given width of the deck surface. Wheels are located at one end of the deck for rollably supporting the deck surface at a given height above a surface upon which the trailer is to be moved for transport on the wheels. A movable dimension altering component is located adjacent at least one edge of the deck and is movable between a first position in which the deck surface is of the given width and the given height, and a second position in which at least one of the given width is increased or the given height is decreased. The movable component is mounted for rotation to the deck and defines at least a portion of the deck surface in both the first and second positions.

In another principal aspect of the present invention, both the given width is increased and the given height is decreased when the movable dimension altering component is moved to the second position.

In still another principal aspect of the present invention, the movable dimension altering component which defines the portion of the deck surface is substantially flush with any remaining portion of that surface when the component is in its first position.

In still another principal aspect of the present invention, the movable dimension altering component is elongate and extends in a direction substantially parallel to the edge of the deck adjacent the movable dimension altering component.

In still another principal aspect of the present invention, pivotal mounting means pivotally mounts the movable dimension altering component for rotation between the first and second positions about a longitudinal axis substantially parallel to the edge of the deck adjacent the movable dimension altering component.

In still another principal aspect of the present invention, the movable dimension altering component is a pivotally rotatable platform which is rotatable between the first and second positions.

In still another principal aspect of the present invention, the deck is stepped so that the deck surface comprises an upper surface and a lower surface adjacent at least one of the edges of the deck, and when the platform is in its first position, it overlies the lower surface and supplements the width of the upper surface, and when the platform is in its second position, it supplements the width of the lower surface.

In still another principal aspect of the present invention, the deck at the aforementioned lower surface portion and the platform each have a given thicknesses and outer faces when the platform is in its first position, and the outer faces bear against each other over a height which is greater than at least one of the given thicknesses when the platform is rotated to its second position to support the platform in its second position.

In still another principal aspect of the present invention, the deck has front and rear ends, and a rotatable inclined ramp adjacent at least one of the ends of the deck, and the ramp is mounted for pivotal rotation between a first stored position and a second loading position to assist in the loading or unloading movement of the load between the deck surface and a surface which is at an elevation different than the deck surface.

In still another principal aspect of the present invention, the surface which is at an elevation different than the deck surface is also on the trailer.

These and other objects, features and advantages of the present invention will be more clearly understood upon consideration of the detailed description of the preferred embodiment of the invention which will be described to follow.

BRIEF DESCRIPTION OF THE DRAWINGS

In the course of this description, reference will frequently be made to the attached drawings in which:

FIG. 1 is a perspective view of a preferred embodiment of adjustable dimension trailer constructed in accordance with the principles of the present invention, and in which one side of the trailer has been enlarged to its maximum width and reduced in height;

FIG. 2 is an enlarged, broken, perspective view of a portion of one of the movable dimension altering components constructed in accordance with the principles of the present invention, and which has been moved to its maximum width enlarging and height reducing position;

FIG. 3 is an overall plan view of the trailer substantially as shown in FIG. 1, but in which both sides of the trailer have been enlarged to maximum width and reduced in height; and FIG. 4 is a cross-sectioned elevation view of the trailer, as viewed substantially along lines 4—4 of FIG. 1, and depicting various equipment loads thereon in dot and dash and of both maximum and minimum width and height dimensions, and also depicting the movable dimension altering components in accordance with the principles of the present invention in both the minimum width, rigged in and maximum width, rigged out positions.

DESCRIPTION OF THE PREFERRED EMBODIMENT OF THE INVENTION

A preferred embodiment of adjustable dimension trailer 10 constructed in accordance with the principles of the present invention is shown overall in FIG. 1. The trailer 10 generally comprises a deck 12 having a planar upwardly facing deck surface 14 which is supported and strengthened by transversely and longitudinally extending strengthening beams 16 and 17, as best seen in FIG. 4, beneath the deck. Although the deck surface construction materials are a matter of choice as will be appreciated, the main surface portion of the deck may be typically constructed of wooden planking 18 as shown in the drawings. The deck 12 also includes a pair of spaced longitudinally extending side edges 19 and 20, and the upwardly facing support surfaces of the deck at the edges are formed of the movable dimension altering components constructed in accordance with the principles of the present invention and as will be described in more detail below.

The extended rear portion 22 of the trailer deck preferably includes one or more tandem rear axles 24 which may either have dual or single wheels 26 and which support the deck 12 and its surface 14 for transport and at a given height $h_t$ above the surface S upon which the trailer is to be moved for transport as shown in FIG. 4. Although tandem axles each with dual wheels are shown, it will be appreciated that single axles and/or single wheels may be readily employed without departing from the principles of the invention. This rear deck portion 22 also preferably includes plating or the like to form a rear deck surface 28 between the wheels 26. In addition, short inclined ramps 30 are preferably provided at the front and rear sides of wheels 26 in order to assist the movement for loading and unloading of wheeled equipment loads, such as combines, to and from the deck surface 14 and over the wheels 26 as will be further described below.

As shown in FIGS. 1 and 3, an inclined rear deck ramp 32 is also provided at the rear deck portion 22 for loading and unloading equipment to be transported by the trailer. The rear deck ramp 32 preferably comprises a support surface 34 for the traversing equipment. Each of the deck surfaces 28 and 34 as well as the ramps 30 preferably have an embossed or otherwise roughened surface, such as superimposed expanded metal, to improve the traction of the wheels of the equipment which is being loaded and unloaded onto and off of the trailer.

A pair of spaced pivotally rotatable ramps 36 are preferably mounted to the rear of the rear deck ramp 32, as best shown in FIGS. 1 and 3. These ramps 36 may be rotated between the stored position, as shown at the left of the trailer in FIG. 1 as viewed from its rear, to the operative position, as shown to the right of the trailer in FIG. 1 and as shown in FIG. 3. These ramps 36 are pivotally mounted on pivot rods 38 as shown in FIGS. 1 and 3, and the rods preferably are mounted to slide transversely in and out to permit adjustment of the width distance between the ramps depending upon whether equipment of minimum or maximum width is to be loaded.

The trailer also preferably includes a goose neck deck 40 at the front of the trailer and forward of the deck 12, also as best seen in FIGS. 1 and 3. This goose neck deck includes a roughened support surface 42 upon which equipment or other loads may be supported for transport if desired. Suitable fifth wheel coupling structure (not shown) is located beneath the goose neck deck 40 for coupling the trailer 10 to a tractor T (as shown in dot and dash) for hauling the trailer.

Rotatable ramps 44, as best seen in FIGS. 1 and 3, are also preferably provided at the rear of the goose neck deck 40 to facilitate movement of the wheels of the equipment to be loaded for transport from the deck surface 14 to the support surface 42 of the goose neck 40, if some portion of the equipment is to be moved onto the latter surface and supported thereon for transport. These ramps 44 are mounted for rotatable pivotal movement by hinges 46, as best seen in FIGS. 1 and 3. The ramps 44 comprise open box-like structures which are triangular in cross-section, as best seen in FIG. 1, and which have an inclined surface covered with a heavy duty expanded metal mesh 48 to maximize traction for loading and unloading the equipment to and from the goose neck surface 42. As depicted in FIG. 1, the rotatable ramp 44 to the right as viewed from the rear of the trailer, is shown in its lowered loading position, and the left ramp is shown in its upright stored position. It will be seen that the ramps 44 (and also the ramps 36) due to their generally hollow construction have a reduced weight to readily facilitate and permit manual positioning of the ramps. For this purpose one or more gripping handles 50 are provided for example on the ramps 44, as best seen in FIG. 1.

With the possible exception of the manually operated inclined ramps 36 and 44, the trailer which has thus far been described is in general typical of "lowboy" trailers. This is because the main surface 14 of the deck 12 between the rear deck portion 22 and its rear axles 24 and wheels 26 and the front goose neck deck 40, and upon which the largest sized equipment is to be supported for transport, is at a minimum height $h_1$ above the surface S. This permits the maximization to the extent possible in these lowboy trailers of the height of the equipment loads that can be transported upon the deck surface 14 of the lowboy trailer. Thus, the height $h_2$ of such equipment as shown in FIG. 4, can be anything up to a height wherein the sum of $h_2$ and the height $h_1$ of the deck surface 14 above the surface S upon which the trailer is to be moved for transport does not exceed the governmental height restriction of 13.5–14 feet.

In the preferred embodiment of the present invention, dimension altering components are provided each of which comprises one or more longitudinally extending, rotatably movable platforms 52 adjacent each of the respective deck edges 19 and 20 as shown in the drawings. Although three platforms 52 are shown in serial relationship along each edge of the deck 12, it will be appreciated that the number of platforms may vary depending upon the length of the trailer and/or the ease with which the platforms are to be moved between the minimum width and maximum width positions.

As shown in the drawings, the deck 12 includes a stepped portion 54 which preferably extends longitudinally over substantially the entire length of the deck 12 along each of its edges 19 and 20. The stepped portion 54 has a thickness which is less than the overall thickness of the deck 12 at the deck surface 14 so that the stepped portions 54 on each side of the trailer define a surface 56 which extends along each of the deck edges 19 and 20, but is lower than the deck surface 14. The thickness of the stepped portions 54 and platforms 52 is preferably about one-half the overall thickness of the deck 12.

The stepped portions 54 also have an outer face 58, as best seen in FIG. 4, which faces outwardly of the trailer. The outer face 58 is preferably of a height which is somewhat greater than the thickness of the stepped portion 54, as best seen in FIG. 4, in order to maximize the strength and support of the platforms 52 when they are in their maximum width positions as will be described in more detail below. The additional height of the outer face 58 also permits the attachment of an angularly upward extending flange 60 along the bottom of the face, as shown in FIGS. 2 and 4. Flange 60 further strengthens the step portion 54 and permits an anchoring site for a tie down hook or other fastener 62 and chain 63, as shown in dot and dash in FIG. 4.

Each of the rotatably movable platforms 52 also includes a face 64, as seen in FIG. 4. The face 64 is positioned adjacent the deck edges 19 and 20, either when the platform 52 is in its minimum width position as viewed in solid to the left of FIG. 4, or in its maximum width position as viewed in solid to the right of FIG. 4. The face 64 is also preferably of a height somewhat greater than the thickness of the platform so that the face 64 extends somewhat beneath the platform 52, as shown to the right in FIG. 4. Face 64 also preferably includes a longitudinally extending angular flange 66 as shown in the drawings. Accordingly, the greater height platform face 64 and flange 66 also reinforce the platform particularly when the platform 52 is positioned in its maximum width position as viewed in solid to the right in FIG. 4. In addition, the flange 66 also forms a low upwardly extending rim extending along the deck edges 19 and 20 when the platform 52 is in its minimum width position, as viewed in solid to the left in FIG. 4. Thus the rim provides somewhat of a barrier or low wall to keep small objects which may be loosely positioned on the deck surface from freely rolling off of the deck surface during transport.

The platforms 52 are individually pivotally mounted for rotation along the outer edges 19 and 20 of the trailer by a plurality of pin hinges 68. The strap components of each of the hinges 68 may be rotatably mounted to each other by individual pins for each hinge, as in conventional door hinges, or with a single longitudinally extending pin 70 which extends through several or all of the hinges of each respective platform as shown in FIG. 2.

The top side of the each of the platforms 52, when they are in their minimum width position as shown in solid to the left in FIG. 4, is preferably covered with a solid decking plate 72. The thickness of the platform is such that when it is in the minimum width position, the decking plate 72 is preferably flush with the deck surface 14 to define a portion of the deck for support of the load thereon for transport. The decking plates 72 may also include one or more slots 74, as best seen in FIG. 1, to assist in the initial manual opening to the outer, maximum width position. Additionally, the outermost faces of the platforms 52 may have slots 75 both for lightening and to receive a lever, such as a 2×4, to assist in manual movement of the platforms between their positions.

Both the platforms 52 and stepped portions 54 of the deck are preferably formed of suitable rigidly fixed, short transverse I-beams 76. These beams are of sufficient strength and rigidity to rigidly support the equipment loads thereon whether the equipment is resting and supported upon the platforms and step portions when the platforms 52 are in their minimum width or in their maximum width position. Short spacers 78, as best seen in FIGS. 1, 2 and 4, may be provided on the top surfaces of the beams 76 of the stepped portions 54. The spacers 78 are of a height substantially equal to the height of the hinges 68 when the platform 52 is in its minimum width position as shown in solid to the left in FIG. 4. Thus, the spacers 78 support the platforms in a substantially level and flush relationship to the deck surface 14 when the platforms 52 are in their minimum width positions.

In the trailer of the present invention the maximum wide width equipment loads which are to be supported for transport are positioned at the portion of the deck 12 in which the platforms 52 are capable of adjustment to the maximum width position. However, it will be seen that it will be necessary that the tires or wheels of the equipment load which are of maximum tread greater than that of the trailer wheels 26 must transit past the wheels 26 of the trailer in order to reach a position in which they rest upon and are supported by the platforms when positioned in their maximum width position. For this purpose a short set of pullout side extensions 80 preferably are provided on the rear deck portion 22 outboard of the wheels 26. A short pair of pullout side extensions 82 are also preferably provided on the rear deck ramp 32 and in alignment with the wheel pullout extensions 80. These pullout extensions have the principal and only function of onloading and offloading the equipment, and they are preferably restored once their function is complete and during transport. In addition, and as previously discussed, the rotatable ramps 36 at the end of the trailer are preferably mounted on slidable pivot rods 38 to permit their alignment either as shown in FIGS. 1 and 3 with the ramp pull out extensions 82 as pulled out, or in alignment with the support surface 34 when the ramp pull out extensions 82 are not pulled out.

Although it is believed from the foregoing description that the operation of the adjustable dimension trailer of the preferred embodiment of the invention will be clear, a description of the operation follows.

Description of Operation

1. Minimum Width Load

When equipment loads of only minimum width, i.e. equipment loads in which the tread spacing between the tires is at most either $t_1$ or $t_2$ as shown in dot and dash in FIG. 3, enlargement of the trailer beyond its minimum regulation width dimension is not necessary.

Thus, the trailer platforms 52 will be moved to their inner minimum width position, as shown to the left when viewing the trailer from the rear in FIG. 1, and as shown to the left in solid as shown in FIG. 4. In this minimum width condition the decking plates 72 of the platforms will be facing upwardly and preferably will generally be flush with the remaining deck surface 14 on the trailer deck 12 to present a generally common planar support surface upon which the tire $t_2$ will rest as shown in FIG. 4. In this minimum width condition, the total width w of the trailer, as shown in FIG. 4, will be within governmental width restrictions, e.g. will not exceed 8 feet.

In order to load the minimum width equipment for transport, the wheel pullout extensions 80 and ramp pullout extensions 82 are not needed and will be pushed in to the stored position to present minimum width. Also the rotatable ramps 36 will be rotated downward in their operational position, as seen in FIG. 3, but will be pushed toward each other so that their outer edges generally conform to and align with the width of the support surface 34 of the rear deck ramp 32. In this condition the equipment load may be driven up upon or winched up onto the rotatable ramps 36 and the rear deck ramp 32. The tires $t_1$ and/or $t_2$ will continue to ride over the wheel ramps 30 and the wheels 26 of the trailer.

Ultimately the equipment load of width w will be positioned upon the deck 12, its deck surface 14, and if the width is large enough, on the upward facing decking plates 72 of the platforms 52, the latter of which are in their minimum width position, as shown to the left in solid in FIG. 4. If it is desired to move the equipment load further forward to permit for example the accommodation of two pieces of equipment on the trailer for transport at the same time, the leading equipment load may be moved further forward and the rotatable ramps 44 may be manually moved via handles 50 to their downward position as shown in FIG. 3. In this position the equipment load front end may be moved still further forward and up the metal mesh inclined surfaces 48 of the rotatable ramps 44 until the front tires $t_1$ are positioned for transport on the support surface 42 of the goose neck deck 40, as shown in FIG. 3 in dot and dash.

Once the equipment load or loads have been positioned on the trailer, they may be tied down as desired by way of tie down hooks 62 and chains 63, as best seen in dot and dash in FIG. 4. It will be seen that by virtue of the angular position of flange 60, the possibility of loss of the hooks 62 and chain 63 will be minimized in the event they become loose during transport.

At this time the rotatable ramps 36 may also be moved to their stored transport position, as shown to the left as viewed from the rear of the trailer in FIG. 1.

Unloading of the equipment loads will generally proceed once the equipment reaches its destination by reversal of the foregoing steps.

2. Maximum Width Load

Although most width restrictions limit legal trailer, vehicle or load widths to an 8 or 8.5 feet width standards, the width dimension of the trailer of the present invention can be adjusted from such regulation width up to an even wider maximum wide load width of 11 feet or more. For example, 11 feet may be simply obtained by configuring the width of the platforms 52 and step portions, to be 1.5 feet in width. Thus, when both 1.5 foot width platforms 52 are moved to their maximum width position as will be described below, they will collectively add an additional 3 feet to an already 8 foot wide deck for a total of 11 feet of maximum support width.

In order to load an equipment load having an oversize maximum tread W of tire T, as shown in FIGS. 3 and 4, the platforms 52 are rotated about their hinges 68 and pins 70 from the minimum width position, as shown to the left as viewed from the rear of the trailer in FIG. 1 and to the left in FIG. 4, outwardly to their maximum width positions as shown to the right in FIG. 1, in FIGS. 2 and 3, and in solid to the right and in dot and dash to the left as shown in FIG. 4.

Movement of the platform 52 between its positions may be easily and quickly accomplished manually. This may be facilitated either or both by utilization of the hand holes 74 and/or by the insertion of a 2×4 or a similar assist lever into the rectangular slotted openings 75 of the platform 52.

Once the platform has been rotated to and positioned in its outrigged maximum width position, its previous outer face 64 will bear against the outer face 58 of the step portion 54, as best seen to the right in FIG. 4. It will be seen that the support area between these two faces is substantial and therefore structurally firm in view of the increased bearing area which has been enlarged by virtue of the increased height of those faces relative to the thickness of the stepped portion 54 and platform 52, respectively.

In order to load equipment of oversize tire T tread width W, the pull out extensions 80 and ramp pullout extensions 82 are also pulled out from their stored condition to their maximum as viewed on the right from the rear of the trailer in FIG. 1. In addition, the rotatable ramps 36 are rotated to the operating position and also pulled out to the maximum width position in order to align with the ramp pullout extensions 82, as shown to the right as viewed from the rear of the trailer in FIG. 1, and as shown in FIG. 3.

In this condition of maximum trailer width W, tires T are moved up the ramps 36, over the ramp pullout extensions 82 and along the wheel pullout extensions 80 in straddling relationship to the outside of the wheels 26 of the trailer. Movement of the oversize tread width W tires T continues forward off the wheel pullout extensions 80 and onto the now upwardly facing sides of the platforms 52 which have been positioned in their maximum width position. Movement of the oversize tread tire T is continued forward until it is positioned in its desired location on the support surface provided by the outrigged upwardly facing sides of the platforms 52. Although in the trailer of the present invention there may be some slight difference in elevation between the support surfaces provided by the wheel pullout extensions 80 and the platforms 52, this transition should be relatively easily negotiated due to the typical large size of the oversize tread tires T.

If the equipment load has tires, for example front tires having a minimum width $t_1$ and rear tires having a maximum tread width T, it may be desirable to position at least the front tires $t_1$ of the load on the surface 42 of the goose neck deck 40. If this is desired, such positioning may be simply accomplished as previously described.

Once the equipment load has been properly positioned and is supported for transit on the trailer 10, it too may be tied down for example using the tie down hooks 62 and chains 63 shown to the right in FIG. 4. Again it will be seen that this may be readily accomplished by the angular flanges 60 which also will minimize the possibility of loss of the tie down hook 62 and/or chain 63 in the event that they become loose during transit.

The wheel pullout extensions 80 and/or ramp extensions 82 may now either be stored or left in their outer position during transit. The maximum width W of the trailer is dictated by the platforms 52 which have been moved their maximum width position. However, the load on and impact to the pullout extensions 80 and 82 is minimized in the practice of the present invention because the major portion if not all of the equipment load during transport is supported upon the upper surfaces of the platforms 52 rather than on the pullout extensions as in the past because the latter are primarily only intended for loading and unloading in contrast to the prior art. This minimizes the possibility that the wheel pullout extensions 80 and/or ramp pull out extensions 82 may become bent or sprung during transport due to bouncing of considerable loads which otherwise might have been supported thereon as in the past. This will substantially increase their operability and longevity and minimize the need to structurally strengthen and increase the weight of the extensions. Once loading is complete, the rotatable ramps 36 are moved to their transport position, as shown to the left when viewing the trailer from the rear in FIG. 1.

To unload the oversize equipment load from the trailer once it has reached its destination the foregoing steps are merely reversed.

Equipment loads having a tread width intermediate the oversize width W of tire tread T and the minimum regulation width w of tire tread $t_2$ may also be loaded, supported, transported and unloaded from the adjustable dimension trailer of the invention. To do this, the wheel pullout extension 80 and ramp pullout extension 82 on only one side of the trailer are pulled out to their maximum width position, and the corresponding rotatable ramp 36 is moved into alignment with its extended ramp pullout extension 82, for example as shown in FIG. 1. The other side of the trailer is left in its minimum width condition with its rotatable ramp 36 left in alignment with the wheels 26, and its pullout extensions are left in their stored positions. Likewise, the platforms 52 on only one side of the trailer need be deployed to their maximum width position, again as shown in FIG. 1.

In order to load such intermediate tread width equipment, one tire of the equipment is aligned to be supported on and roll up the extended rotatable ramp 36, the extended maximum width ramp pullout extension 82 and wheel pull out extension 80 so that its tire passes outside of the wheels 26 on that side of the trailer as did the tire T as previously described. The tires on the other side of the equipment load will ride up the rotatable ramp 36 on the other side of the trailer, and over the top of wheels 26 on the other side of the trailer as did the tire $t_2$ as previously described. As movement of the equipment load progresses forward, its tires will come to bear upon the upper face of the platforms 52 which have been rotated to the maximum width position on one side of the trailer. The tires on the other side of the equipment load will simply bear upon the upwardly facing decking plates 72 of the platforms 52 which remain in their minimum width position.

Again, unloading of this intermediate width equipment load simply involves the reversal of the last described steps.

3. Maximum Height Load

It will be seen that the adjustable dimension trailer of the present invention also has the advantage of adjustment to permit lowering of the height of the equipment load when the platforms 52 are moved from their minimum width w position, as shown to the left in FIG. 4 in solid, to their maximum width W position as shown to the right in solid. This is due to their pivotal, rotatable movement into and out of overlying relationship with the stepped portion 54 of the deck. Thus, equipment loads of excessive heights may be accommodated for transport on the trailer of the present invention and still be within maximum governmental height restrictions, even though they would have exceeded such height restrictions when transported even on lowboy trailers of the prior art, because the prior art trailers either did not provide for dimensional adjustment or the prior pullout adjustment trailers did not result in a height change. By way of example it will be seen with reference particularly to FIG. 4, that when the platforms 52 are rotated to their maximum width position as shown in solid to the right in FIG. 4, the tire T will now rest on a surface which has been lowered by an amount $\Delta h$ from the remaining deck surface 14, as shown in FIG. 4. Thus, the overall height $h_2$ of the equipment load may be taller by the amount $\Delta h$ and still be within maximum governmental restriction height. Indeed, $\Delta h$ may be on the order of 0.5 foot.

It will also be seen that the equipment load may either be of minimum regulation width w or of oversize width W and still take advantage of the height reduction made possible by the present invention. If the load is of minimum width, its tires $t_2$ will simply be supported on the upper side of the stepped portion 54 when the platforms are rotated outward to the maximum width position. If the load is of maximum width, its tires T will be supported on the upper surface of the platforms 52 as shown to the right in FIG. 4. Moreover, where the load is of minimum regulation width w so that it rests on the stepped portion 54, the platform 52 in the alternative to outward rotation may be simply removed by removal of the hinge pins 70 to maintain the width of the trailer also at minimum width w.

This additional height advantage of the present invention has been found to be sufficient, for example in the case of certain harvesting combines, to eliminate the need for the use of special sized, nonfunctional transport tires which were previously needed to permit a sufficient lowering of the height of the combines to be transported from the factory to the distributor. Once transported, it was necessary for the distributor to remove the special transport wheels and replace them with functional tires, and then send the transport tires back to the manufacturer. By virtue of the ability of the present invention to achieve a $\Delta h$ as shown in FIG. 4 of on the order of 0.5 feet, it has been found that such transport tires are no longer necessary and that the combines which previously required such special tires now may be shipped from the manufacturer to the distributor with their functional tires already installed, thus eliminating the need for the provision of the special transport tires in the first instance, and their removal and transport back to the manufacturer.

From the foregoing it will be appreciated that the adjustable dimensional trailer in accordance with the present invention minimizes both the possibility of bending or springing of the movable dimension altering components of the invention and, therefore, also minimizes the difficulty or impossibility of operation due to such bending or springing. Moreover, the movable dimension altering components or platforms of the present invention are firmly supported and of strong structural construction and yet of minimum weight. This results in an improvement in fuel economy, ability to meet weight restrictions, and permits manual positioning and operation. Thus, complex and expensive hydraulic systems or other power operating mechanisms are avoided. Additionally, the adjustable dimension trailer of the present invention is capable of permitting both width and height adjustments which maximize the load dimensions which the trailer of the invention can transport.

It will be understood that the preferred embodiment of the present invention which has been described is merely illustrative of the principles of the present invention. Numerous modifications may be made by those skilled in the art without departing from the true spirit and scope of the invention.

I claim:

1. A trailer for the transport of loads of various different dimensions, comprising an elongate deck having a surface for receiving and supporting the loads for transport thereon; said deck having a pair of spaced generally parallel edges which define a given width of said deck surface;

wheels at one end of the deck for rollably supporting said deck surface at a given height above a surface upon which the trailer is to be moved for transport on the wheels;

a plurality of movable dimension altering components adjacent at least one edge of said deck, said dimension altering components extending in substantially parallel end to end relationship to each other and being movable independently of each other between a first position in which said deck surface is of said given width and said given height, and a second position in which at least one of said given width is increased or said given height is decreased; and wherein said movable components are mounted to said deck and define at least a portion of said deck surface in both of said first and second positions.

2. The trailer of claim 1, wherein said given width is increased when said movable dimension altering components is moved to said second position.

3. The trailer of claim 1, wherein said given height is decreased when said movable dimension altering components is moved to said second position.

4. The trailer of claim 3, wherein said movable dimension altering components which defines said portion of said deck surface is substantially flush with any remaining portion of said surface when said component is in said first position.

5. The trailer of claim 1, wherein both said given width is increased and said given height is decreased when said movable dimension altering components is moved to said second position.

6. The trailer of claim 5, wherein said width increase and height decrease occur simultaneously when said dimension altering components is moved to said second position.

7. The trailer of claim 1, wherein said movable dimension altering components are elongate and extends in a direction substantially parallel to the edge of said deck adjacent said movable dimension altering component.

8. The trailer of claim 7, including pivotal mounting means for pivotally mounting said movable dimension altering components for rotation independently of each other between said first and second positions about a longitudinal axis substantially parallel to the edge of the deck adjacent said movable dimension altering component.

9. The trailer of claim 1, wherein said movable dimension altering components comprise a plurality of pivotally rotatable platforms which are rotatable independently of each other between said first and second positions.

10. The trailer of claim 9, wherein said deck is stepped so that said deck surface comprises an upper surface and a lower surface adjacent said at least one edge of said deck, and when one of said platforms is in said first position it overlies said lower surface and supplements the width of said upper surface, and when said platform is in said second position, it supplements the width of said lower surface.

11. The trailer of claim 10, wherein said deck at said lower surface portion of said deck and said one of said platforms each have given thicknesses and outer faces when said platform is in said first position; and wherein said outer faces bear against each other over a height which is greater than at least one of said given thicknesses when said platform is rotated to said second position to support said platform in said second position.

12. The trailer of claim 1, wherein said deck has front and rear ends, and a rotatable inclined ramp adjacent at least one of the front or rear ends of said deck, said ramp being mounted for pivotal rotation between a first stored position and a second loading position to assist in the loading or unloading movement of the load between said deck surface and a surface at an elevation different than the deck surface.

13. The trailer of claim 11, wherein said surface at a elevation different than said deck surface is also on the trailer.

14. A trailer for the transport of loads of various different dimensions, comprising
an elongate deck having a surface for receiving and supporting the loads for transport thereon; said deck having a pair of spaced generally parallel edges which define a given width of said deck surface;
wheels at one end of the deck for rollably supporting said deck surface at a given height above a surface upon which the trailer is to be moved for transport on the wheels; and
a plurality of movable dimension altering components adjacent at least one edge of said deck, said dimension altering components extending in substantially parallel end to end relationship to each other and being movably rotatable about a longitudinal axis which is substantially parallel to at least one of the edges of said deck and between a first position in which said deck surface is of said given width and said given height, and a second position in which said given width is increased and said given height is decreased.

15. The trailer of claim 14, wherein at least one of said movable dimension altering components defines at least a portion of said deck surface and which portion is substantially flush with any remaining portion of said surface when said dimension altering component is in said first position.

16. The trailer of claim 14, wherein at least one of said movable dimension altering components comprises a pivotally rotatable platform which is rotatable between said first and second positions.

17. The trailer of claim 16, wherein said deck is stepped so that said deck surface comprises an upper surface and a lower surface adjacent said at least one edge of said deck, and when said platform is in said first position it overlies said lower surface and supplements the width of said upper surface, and when said platform is in said second position, it supplements the width of said lower surface.

18. The trailer of claim 17, wherein said deck at said lower surface portion of said deck and said platform each have given thicknesses and outer faces when said platform is in said first position; and wherein said outer faces bear against each other over a height which is greater than at least one of said given thicknesses when said platform is rotated to said second position to support said platform in said second position.

19. The trailer of claim 14, wherein said deck has front and rear ends, and a rotatable inclined ramp adjacent at least one of the front or rear ends of said deck, said ramp being mounted for pivotal rotation between a first stored position and a second loading position to assist in the loading or unloading movement of the load between said deck surface and a surface at an elevation different than the deck surface.

20. The trailer of claim 19, wherein said surface at an elevation different than said deck surface is also on the trailer.

21. A method of adjusting a dimension of a trailer to accommodate loads of various different dimensions, comprising:
providing a deck on the trailer which has a surface for receiving and supporting the load thereon for transport of the load on the deck of the trailer, said surface having a given width and a given height;
providing a plurality of movable dimension altering components on said deck, at least two of said plurality of dimension altering components extending in substantially parallel end to end relationship to each other and being positioned adjacent an edge of said deck and having a portion thereof which defines said deck surface when said component is in a first position; and
moving said at least one of said dimension altering components to a second position in which a portion of said dimension altering component also defines said deck surface, but in which at least one of said given width is increased or said given height is decreased.

22. The method of claim 21, wherein said given width is increased when at least one of said movable dimension altering components is moved to said second position.

23. The method of claim 21, wherein said given height is decreased when at least one of said movable dimension altering components is moved to said second position.

24. The method of claim 21, wherein both said given width is increased and said given height is decreased when at least one of said movable dimension altering components is moved to said second position.

25. The method of claim 21, wherein at least one of said movable dimension altering components which defines said portion of said deck surface is substantially flush with any remaining portion of said deck surface when said component is in said first position.

26. The method of claim 21, wherein at least one of said movable dimension altering components is pivotally rotated between said first and second positions about a longitudinal axis substantially parallel to the edge of the deck adjacent said movable dimension altering component.

27. The method of claim 21, wherein at least one of said movable dimension altering components comprises a pivotally rotatable platform which is rotatable between said first and second positions; the deck is stepped so that said deck surface comprises an upper surface and a lower surface adjacent at least one of said edges; and when the platform is in said first position, it overlies the lower surface and supplements the width of the upper surface, and when the platform is rotated to the second position, it supplements the width of the lower surface.

28. The trailer of claim 1, wherein the trailer is a lowboy trailer in which said given height of said deck surface is located intermediate the height of said wheels when the trailer is to be moved for transport on the wheels.

29. The trailer of claim 14, wherein the trailer is a lowboy trailer in which said given height of said deck surface is located intermediate the height of said wheels when the trailer is to be moved for transport on the wheels.

30. The method of claim 21, wherein the trailer is a lowboy trailer which is supported for transport at one end of the deck by wheels, and in which said given height of said deck surface is located intermediate the height of said wheels when the trailer is to be moved for transport on the wheels.

31. The trailer of claim 1, wherein said movable dimension altering components are movable manually between said first and second positions.

32. The trailer of claim 14, wherein said movable dimension altering components are rotatable manually between said first and second positions.

33. The method of claim 21, wherein said movable dimension altering components are moved manually between said first and second positions.

34. The trailer of claim 14, wherein said dimension altering components are movable independently of each other between said first and second positions.

35. The method of claim 21, wherein said dimension altering components are moved independently of each other between said first and second positions.

* * * * *

UNITED STATES PATENT AND TRADEMARK OFFICE
CERTIFICATE OF CORRECTION

PATENT NO.   : 5,924,754
DATED        : July 20, 1999
INVENTOR(S)  : Abe B. Kuhns It is certified that error appears in the above-identified patent and that said Letters Patent is hereby corrected as shown below:

<u>Title page,</u>
OTHER PUBLICATIONS, add a third publication as follows -- Photograph of an adjustable dimension trailer of Cole Implements, Media, Illinois --.

<u>Column 3,</u>
Line 38, delete "a".

<u>Column 4,</u>
Line 7, delete "a".

<u>Column 5,</u>
Line 13, change "$h_l$" to -- $h_1$ --.

<u>Column 7,</u>
Line 28, delete "the".

<u>Column 10,</u>
Line 24, after "moved" insert -- to --.

<u>Column 12,</u>
Lines 50, 53, 60, and 64, after "when" insert -- at least one of --.
Line 56, change "defines" to -- define --.
Line 57, change "is" to -- are --.
Line 67, change "extends" to -- extend --.

<u>Column 13,</u>
Line 34, change "a" to -- an --.

Signed and Sealed this

Twenty-seventh Day of November, 2001

*Attest:*

NICHOLAS P. GODICI
*Attesting Officer*   Acting Director of the United States Patent and Trademark Office